United States Patent
Gu et al.

(10) Patent No.: US 8,804,562 B2
(45) Date of Patent: Aug. 12, 2014

(54) BROADBAND NETWORK SYSTEM AND IMPLEMENTATION METHOD THEREOF

(75) Inventors: Zhongyu Gu, Shenzhen (CN); Fangwei Hu, Shenzhen (CN); Yuehua Wei, Shenzhen (CN); Lu Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 196 days.

(21) Appl. No.: 13/505,674

(22) PCT Filed: Apr. 16, 2010

(86) PCT No.: PCT/CN2010/071847
§ 371 (c)(1),
(2), (4) Date: Jul. 17, 2012

(87) PCT Pub. No.: WO2010/145289
PCT Pub. Date: Dec. 23, 2010

(65) Prior Publication Data
US 2012/0281591 A1    Nov. 8, 2012

(30) Foreign Application Priority Data

Nov. 3, 2009 (CN) .......................... 2009 1 0209649

(51) Int. Cl.
*H04L 12/26* (2006.01)
*H04L 12/28* (2006.01)
*H04L 29/12* (2006.01)

(52) U.S. Cl.
CPC ........... *H04L 12/2859* (2013.01); *H04L 61/203* (2013.01); *H04L 61/103* (2013.01); *H04L 61/2015* (2013.01); *H04L 12/2872* (2013.01)
USPC .......................................... 370/252; 370/392

(58) Field of Classification Search
None
See application file for complete search history.

(56) References Cited

U.S. PATENT DOCUMENTS

2002/0083198 A1    6/2002    Kim et al.
2011/0019660 A1*   1/2011    Kumarasamy et al. ....... 370/352

FOREIGN PATENT DOCUMENTS

CN    1458761 A    11/2001
CN    1801764 A    7/2006

* cited by examiner

*Primary Examiner* — Ashley Shivers
(74) *Attorney, Agent, or Firm* — McGarry Bair PC

(57) ABSTRACT

This disclosure discloses a broadband network system and an implementation method thereof. The method comprises the steps that: a terminal transmits an IP address request message to the network side (S10); after receiving the IP address request message, the network side returns the non-IP-address EID of the terminal (S20); the terminal uses the received EID as the address to transmit and receive packets (S30). With this disclosure, the demands of the broadband network on the IP address are reduced.

17 Claims, 8 Drawing Sheets

BROADBAND NETWORK SYSTEM AND IMPLEMENTATION METHOD THEREOF

CROSS-REFERENCE TO RELATED APPLICATIONS

This application is a National Phase application of International Application No. PCT/CN2010/071847, filed Apr. 16, 2010, which claims the benefit of Chinese Patent Application No. 200910209649.3, filed Nov. 3, 2009, both of which are incorporated herein by reference in their entirety.

FIELD OF THE INVENTION

This disclosure relates to the field of communication, and in particular to a broadband network system and an implementation method thereof.

BACKGROUND OF THE INVENTION

With the development of the communication technology, computer technology, Internet technology and multimedia application technology, information network tends to be broadband, has accessed to ordinary families, and is developing in a high growth rate. The development of the fixed broadband network, on one hand, attributes to the development of broadband access technologies such as Asymmetric Digital Subscriber Line (ADSL)/Very-high-bit-rate Digital Subscriber Line (VDSL), which may provide large bandwidth to meet the increasing multimedia application demands; and on the other hand, attributes to that Internet brings great convenience and rich information to users. Therefore the development of broadband network is also quite fast. To meet the demands of users, a large quantity of IP address are needed.

FIG. 1 illustrates a structure diagram of a typical fixed broadband network in the related technology. As shown in FIG. 1, Personal Computer (PC) of common broadband users is accessed to a Broadband Remote Access Server (BRAS) by home/residential Customer Premises Equipment (CPE)/Residential Gateway (RG), or broadband access equipment, and through broadband aggregate equipment. For enterprise users, the computer is generally accessed to an Access Router (AR) or Service Router (SR) through broadband access network (it may be a network formed of access equipment and aggregate equipment, or more complex networking form).

FIG. 2 illustrates a flow chart of PPP over Ethernet (PPPoE) broadband network user authentication/IP address allocation in the related technologies. As shown in FIG. 2, take PPPoE as example, the flow comprises the following processing steps.

S201: PC broadcasts a PPPoE Active Discovery Initiation (PADI) packet.

S202: After receiving the PADI packet within the serving range, all potential access concentrators (i.e., Broadband Remote Access Server, BRAS) in the broadcast domain return a PPPoE Active Discovery Offer (PADO) packet to respond the request.

S203: The PC selects one proper access concentrator from a plurality of possibly received PADO packets, and then transmits a PPPoE Active Discovery Request (PADR) packet to the selected access concentrator.

S204: After receiving the PADR packet, the access concentrator gets ready to start a Point-to-Point Protocol (PPP) session, transmits a PPPoE Active Discovery Session-confirmation (PADS) packet, and allocates and returns a session ID.

S205: The PPPoE client (i.e., the PC in FIG. 2) transmits a configuration request including the maximum message scale and authentication way or the like.

S206: A response is configured, to implement the purpose defined by the line feature.

S207: The BRAS initiates an authentication challenge.

S208: The PPPoE client responds the challenge.

S209: The BRAS transmits a Remote Authentication Dial In User Service (RADIUS) message to an Authentication, Authorization, and Accounting (AAA) server, for user ID authentication.

S210: The BRAS receives an RADIUS response.

S211: After passing the authentication, the BRAS transmits an authentication success message to the PPPoE client.

S212: The client transmits an IP address request message to the BRAS.

S213: The BRAS allocates an IP address, and returns an IP address through an address request response message.

S214: The client performs relevant services through the obtained IP address.

In the broadband network, there is another typical user authentication and IP address application solution. That is, IP over Ethernet (IPoE) solution based on Dynamic Host Configuration Protocol (DHCP).

FIG. 3 illustrates a flow chart of IPoE broadband network user authentication/IP address allocation in the related technologies. As shown in FIG. 3, take IPoE as example, the flow comprises the following processing steps.

S301: After the PC is powered on, generally it will transmit a DHCP discovery broadcast message to require to be allocated with an IP address.

S302: The broadband access server receives the DHCP discovery message and performs the ID authentication. During this process, a lot of configurations and preparations are needed. For example, a unique channel is formed between the PC and the broadband access server through VLAN, so that the operator can confirm the user uniquely; the broadband access server transmits an RADIUS request to the AAA server to implement the authentication of the user.

S303: The AAA server returns an RADIUS response after realizing the authentication.

S304: After passing the authentication, the broadband access server forwards a DHCP discovery message to the DHCP server, and the DHCP server allocates an IP address to the PC.

S305: The PC selects a proper IP address from a plurality of available IP address offers to transmit a DHCP request to the DHCP server.

S306: After receiving the DHCP request, the DHCP server returns DHCP acknowledge information.

S307: The PC performs service connection through the obtained IP address.

At present, in the IP network research field, the basic conception of researching the user locator/ID separation technology is that: IP address has double meanings, one of which is that IP address identifies the locator information of the user, and the other one is that IP address also identifies the identity of the terminal/user uniquely. To solve problems of network routing, such as extendibility, mobility and multi-connecting/multi-homing, many technologies have been developed or are developing, for example, Host Identity Protocol (HIP), Locator/ID Separation Protocol (LISP) or the like. In the locator/ID separation technology, the PC may be identified by the Endpoint Identifier (EID). Through the mapping from the corresponding EID to the interface IP address (i.e., Routing Locator RLOC) of the border router and through the tunnel encapsulation of messages by the border tunnel router, messages are transferred on the backbone network, so that problems such as extendibility and mobility of routing in the existing IP network are solved.

With the increasing development of IP services of the mobile and broadband networks, a large quantity of IP addresses are needed. IPv4 addresses are nearly used up, and IP addresses are in shortage. How to obtain a large quantity of IP addresses to meet the demands is a great challenge for the operators. The inventors find that, based on the above reason, in the related technologies, indication of EID by IP address is a great waste.

SUMMARY OF THE INVENTION

The purpose of this disclosure is to provide a broadband network system and an implementation method thereof, to solve the problem of resource waste caused by indication of EID by IP address due to the shortage of IP addresses in the related technologies.

According to one aspect of this disclosure, an implementation method of a broadband network system is provided, comprising the steps that: a terminal transmits an IP address request message to the network side; after receiving the IP address request message, the network side returns the non-IP-address EID of the terminal; the terminal uses the received EID as the address to transmit and receive packets.

Further, the EID of the terminal includes at least one of the following: national identification number, passport number, driver's license number, domain name system, defined numbering system, and telephone number of the user using the terminal.

Further, before the step that a terminal transmits an IP address request message to the network side, the method further comprises the steps that: the PPPoE user authentication with the network side, and passes the authentication; and the step that the terminal uses the received EID as the address to transmit and receive packets comprises the steps that: the terminal uses the received EID as the source address to perform EID packet encapsulation for the service data and perform PPPoE frame encapsulation for the EID-encapsulated packet, and transmits the PPPoE-encapsulated frame; a BRAS at the network side analyzes the received PPPoE-encapsulated frame, and searches an RLOC address corresponding to the EID of the destination carried in the analyzed EID-encapsulated packet according to the corresponding relationship of EID/RLOC; the BRAS performs IP packet encapsulation for the EID-encapsulated packet according to the searched RLOC address, and transmits the IP-encapsulated IP packet.

Further, the step that the terminal uses the received EID as the address to transmit and receive packets further comprises the steps that: the BRAS receives the IP packet, identifies the IP packet as an EID-encapsulated packet, and analyzes the EID-encapsulated packet; the BRAS uses the destination EID of the EID packet to search the PPPoE session of the corresponding user, performs PPPoE frame encapsulation for the EID packet, and transmits the PPPoE-encapsulated frame; the terminal obtains the EID-encapsulated packet after receiving the PPPoE-encapsulated frame, and processes the obtained service data.

Further, before the step that a terminal transmits an IP address request message to the network side, the method further comprises the steps that: the terminal performs PPPoE user authentication with the network side, and passes the authentication;

the step that the network side returns the EID of the terminal after receiving the IP address request message comprises the steps that: the BRAS establishes an IP tunnel with a border tunnel router at the network side, and establishes a corresponding relationship between the IP tunnel and the PPPoE session ID; and the step that the terminal uses the received EID as the address to transmit and receive packets comprises the steps that: the terminal uses the received EID as the source address to perform EID packet encapsulation for the service data and perform PPPoE frame encapsulation for the EID-encapsulated packet, and transmits the PPPoE-encapsulated frame; the BRAS at the network side analyzes the received PPPoE-encapsulated frame to obtain the EID-encapsulated packet; the BRAS performs IP tunnel encapsulation for the EID-encapsulated packet correspondingly, and transmits the IP-tunnel-encapsulated packet to the border tunnel router; the border tunnel router analyzes the received IP-tunnel-encapsulated packet to obtain the EID-encapsulated packet, and searches the RLOC address corresponding to the EID of the destination carried in the EID-encapsulated packet according to the corresponding relationship of EID/RLOC; the border tunnel router performs IP packet encapsulation for the EID-encapsulated packet according to the searched RLOC address, and transmits the IP-encapsulated IP packet.

Further, the step that the terminal uses the received EID as the address to transmit and receive packets further comprises the steps that: the border tunnel router receives the IP packet, identifies the IP packet as an EID-encapsulated packet, and analyzes the EID-encapsulated packet; the border tunnel router uses the destination EID of the EID packet to search the corresponding IP tunnel, performs IP tunnel encapsulation for the EID packet, and then transmits the message to the BRAS; the BRAS analyzes the received IP-tunnel-encapsulated packet to obtain the EID packet; the BRAS uses the destination EID of the EID packet to search the PPPoE session of the corresponding user, performs PPPoE frame encapsulation for the EID packet, and transmits the PPPoE-encapsulated frame; the terminal obtains the EID-encapsulated packet after receiving the PPPoE-encapsulated frame, and processes the obtained service data.

Further, the step that a terminal transmits an IP address request message to the network side comprises the steps that: the terminal transmits a Dynamic Host Configuration Protocol (DHCP) discovery broadcast message to a DHCP server or BRAS at the network side;

the step that the network side returns the EID of the terminal after receiving the IP address request message comprises the steps that: the BRAS performs ID authentication for the terminal after receiving the DHCP discovery broadcast message, and authenticates the terminal successfully; and the step that the terminal uses the received EID as the address to transmit and receive packets comprises the steps that: the terminal uses the received EID as the source address to perform EID packet encapsulation for the service data and Virtual Local Area Network (VLAN) message encapsulation for the EID-encapsulated packet according to the preconfigured VLAN, and transmits the VLAN-encapsulated frame; the BRAS analyzes the received VLAN-encapsulated frame, and searches the RLOC address corresponding to the EID of the destination carried in the analyzed EID-encapsulated packet according to the corresponding relationship of EID/RLOC; the BRAS performs IP packet encapsulation for the EID-encapsulated packet according to the searched RLOC address, and transmits the IP-encapsulated IP packet.

Further, the step that the terminal uses the received EID as the address to transmit and receive packets further comprises the steps that: the BRAS receives the IP packet, identifies the IP packet as an EID-encapsulated packet, and analyzes the EID-encapsulated packet; the BRAS uses the destination EID of the EID packet to search the corresponding VLAN-encapsulation information, performs VLAN frame encapsulation for the EID packet, and transmits the VLAN-encapsulated frame; after receiving the VLAN-encapsulated frame, the terminal obtains the EID-encapsulated packet, and processes the obtained service data.

Further, the step that a terminal transmits an IP address request message to the network side comprises the steps that: the terminal transmits a DHCP discovery broadcast message to a DHCP server or BRAS at the network side;

the step that the network side returns the EID of the terminal after receiving the IP address request message comprises the steps that: the BRAS performs ID authentication for the terminal after receiving the DHCP discovery broadcast message, and authenticates the terminal successfully; the BRAS establishes an IP tunnel with a border tunnel router at the network side, and establishes a corresponding relationship between the IP tunnel and the preconfigured VLAN; and the step that the terminal uses the received EID as the address to transmit and receive packets comprises the steps that: the terminal uses the received EID as the source address to perform EID packet encapsulation for the service data and perform VLAN frame encapsulation for the EID-encapsulated packet according to the preconfigured VLAN, and transmits the VLAN-encapsulated frame; the BRAS analyzes the received VLAN-encapsulated frame to obtain the EID-encapsulated packet; the BRAS performs IP packet encapsulation for the EID-encapsulated packet according to the searched RLOC address, and transmits the IP-encapsulated packet to the border tunnel router; the BRAS analyzes the received IP-encapsulated packet to obtain the EID-encapsulated packet, and searches the RLOC address corresponding to the EID of the destination carried in the EID-encapsulated packet according to the corresponding relationship of EID/RLOC; the border tunnel router performs IP packet encapsulation for the EID-encapsulated packet according to the searched RLOC address, and transmits the IP-encapsulated IP packet.

Further, the step that the terminal uses the received EID as the address to transmit and receive packets further comprises the steps that: the border tunnel router receives the IP packet, identifies the IP packet as an EID-encapsulated packet, and analyzes the EID-encapsulated packet; the border tunnel router uses the destination EID of the EID packet to search the IP tunnel corresponding to the EID, performs IP tunnel encapsulation for the EID packet, and then transmits the message to the BRAS; the BRAS analyzes the received IP-tunnel-encapsulated packet, performs VLAN frame encapsulation for the analyzed EID-encapsulated packet, and transmits the VLAN-encapsulated frame; after receiving the VLAN-encapsulated frame, the terminal obtains the EID-encapsulated packet, and processes the obtained service data.

Further, the EID-encapsulated packet carries a source and destination address category indication field, and the source and destination address category indication field indicates the category of the packet.

Further, the DHCP server and the Domain Name Server (DNS) support EID.

Further, the EID is pre-installed in the terminal.

According to another aspect of this disclosure, a broadband network system is further provided, comprising: a terminal, configured to transmit an IP address request message to the network side; and further configured to use the received EID as the address to transmit and receive packets; the network side, configured to return the EID of the terminal after receiving the IP address request message.

Further, the terminal is further configured to perform PPPoE user authentication with the network side and pass the authentication; the terminal comprises:

an encapsulation module, configured to use the received EID as the source address to perform EID packet encapsulation for the service data and perform PPPoE frame encapsulation for the EID-encapsulated packet;

a transmitting module, configured to transmit the PPPoE-encapsulated frame;

the network side comprises: a BRAS/border tunnel router;

the BRAS/border tunnel router is configured to receive the PPPoE-encapsulated frame, and analyze the PPPoE-encapsulated frame to obtain the EID-encapsulated packet; search an RLOC address corresponding to the EID of the destination carried in the analyzed EID-encapsulated packet according to the corresponding relationship of EID/RLOC; and further configured to perform IP packet encapsulation for the EID-encapsulated packet according to the searched RLOC address, and transmit the IP-encapsulated IP packet.

Further, the BRAS/border tunnel router is further configured to receive the IP packet, identify the IP packet as an EID-encapsulated packet, and analyze the EID-encapsulated packet;

the BRAS/border tunnel router is further configured to use the destination EID of the EID packet to search the PPPoE session of the corresponding user, perform PPPoE frame encapsulation for the EID packet, and transmit the PPPoE-encapsulated frame; and the terminal further comprises: a receiving module, configured to obtain the EID-encapsulated packet after receiving the PPPoE-encapsulated frame; and a decapsulation module, configured to decapsulate the specific service data from the EID-encapsulated packet, and delivery the specific service data to the specific application.

Further, he terminal is further configured to perform PPPoE user authentication with the network side and pass the authentication; the terminal comprises:

an encapsulation module, configured to use the received EID as the source address to perform EID packet encapsulation for the service data and perform PPPoE frame encapsulation for the EID-encapsulated packet; and a transmitting module, configured to transmit the PPPoE-encapsulated frame;

the network side comprises: a BRAS and a border tunnel router;

the BRAS is configured to establish an IP tunnel with the border tunnel router at the network side, and establish a corresponding relationship between the IP tunnel and the PPPoE session ID; further configured to analyze the received PPPoE-encapsulated frame to obtain the EID-encapsulated packet; further configured to perform IP tunnel encapsulation for the EID-encapsulated packet correspondingly, and transmit the IP-tunnel-encapsulated packet to the border tunnel router; and the border tunnel router is configured to analyze the received IP-tunnel-encapsulated packet to obtain the EID-encapsulated packet, and search the RLOC address corresponding to the EID of the destination carried in the EID-encapsulated packet according to the corresponding relationship of EID/RLOC; further configured to perform IP packet encapsulation for the EID-encapsulated packet according to the searched RLOC address, and transmit the IP-encapsulated IP packet.

Further, the border tunnel router is further configured to receive the IP packet, identify the IP packet as an EID-encapsulated packet, and analyze the EID-encapsulated packet; further configured to use the destination EID of the EID packet to search the corresponding IP tunnel, perform IP tunnel encapsulation for the EID packet, and then transmit the message to the BRAS;

the BRAS is further configured to analyze the received IP-tunnel-encapsulated packet to obtain the EID packet; further configured to use the destination EID of the EID packet to search the PPPoE session of the corresponding user, perform PPPoE frame encapsulation for the EID packet, and transmit the PPPoE-encapsulated frame; and the terminal further comprises: a receiving module, configured to obtain the EID-encapsulated packet after receiving the PPPoE-encapsulated frame; and a decapsulation module, configured to decapsulate the specific service data from the EID-encapsulated packet, and delivery the specific service data to the specific application.

Further, the terminal is further configured to transmit a DHCP discovery broadcast message to the DHCP server or BRAS at he network side; the terminal comprises:

an encapsulation module, configured to use the received EID as the source address to perform EID packet encapsulation for the service data and VLAN frame encapsulation for the EID-encapsulated packet according to the preconfigured VLAN; and a transmitting module, configured to transmit the VLAN-encapsulated frame;

the network side comprises: a BRAS and a border tunnel router;

the BRAS is configured to perform ID authentication for the terminal after receiving the DHCP discovery broadcast message, and authenticate the terminal successfully; further configured to establish an IP tunnel with the border tunnel router at the network side, and establish a corresponding relationship between the IP tunnel and the preconfigured VLAN; further configured to analyze the received VLAN-encapsulated frame to obtain the EID-encapsulated packet; further configured to perform IP packet encapsulation for the EID-encapsulated packet, and transmit the IP-encapsulated packet to the border tunnel router; and the border tunnel router is configured to analyze the received IP-encapsulated packet to obtain the EID-encapsulated packet, and search the RLOC address corresponding to the EID of the destination carried in the EID-encapsulated packet according to the corresponding relationship of EID/RLOC; further configured to encapsulate the EID-encapsulated packet according to the searched RLOC address, and transmit the IP-encapsulated IP packet.

Further, the border tunnel router is further configured to receive the IP packet, identify the IP packet an EID-encapsulated packet, and analyze the EID-encapsulated packet; further configured to use the destination EID of the EID packet to search the IP tunnel corresponding to the EID, perform IP tunnel encapsulation for the EID packet, and then transmit the message to the BRAS;

the BRAS is further configured to analyze the received IP-tunnel-encapsulated packet, perform VLAN frame encapsulation for the analyzed EID-encapsulated packet, and transmit the VLAN-encapsulated frame; and the terminal further comprises: a receiving module, configured to obtain the EID-encapsulated packet after receiving the VLAN-encapsulated frame; and a decapsulation module, configured to decapsulate the specific service data from the EID-encapsulated packet, and delivery the specific service data to the specific application.

Through this disclosure, by means of applying the locator/ID separation conceptions into the fixed broadband network, the problem of resource waste caused by indication of EID by IP address due to the shortage of IP addresses in the related technologies is solved, and the demands of the broadband network on the IP address are reduced. Therefore a new direction of network evolution is provided.

BRIEF DESCRIPTION OF THE DRAWINGS

Drawings described herein are provided for further standing of this disclosure and form one part of the application. Exemplary embodiments of this disclosure and descriptions thereof are used for explaining this disclosure and do not constitute improper limit to this disclosure. In the drawings.

DETAILED DESCRIPTION OF THE EMBODIMENTS

This disclosure will be described in details hereinafter with reference to drawings and embodiments.

Figure 1:
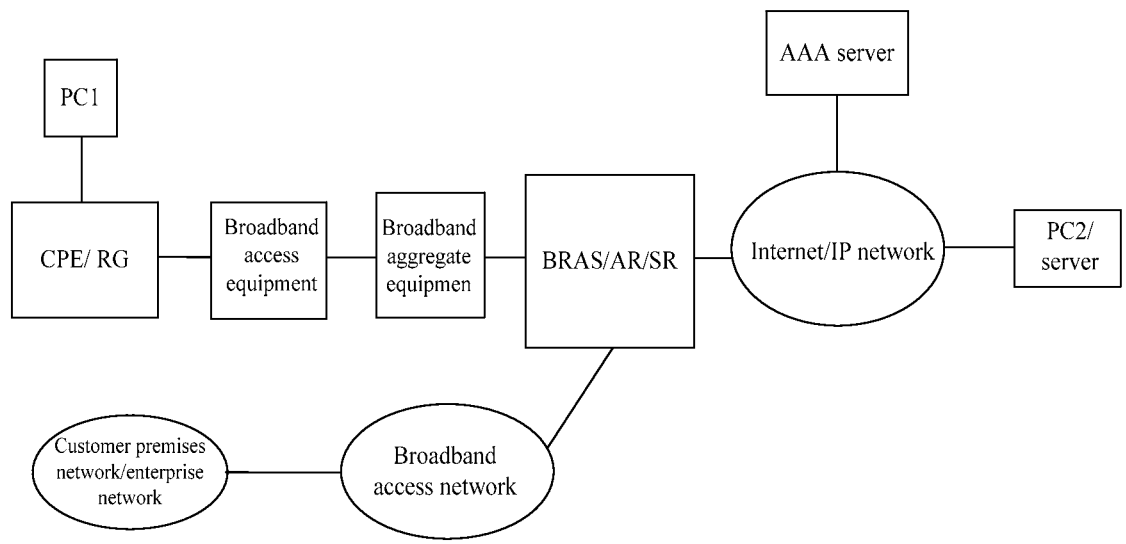
FIG. 1 illustrates a structure diagram of a typical broadband network in the related technologies.
Figure 2:
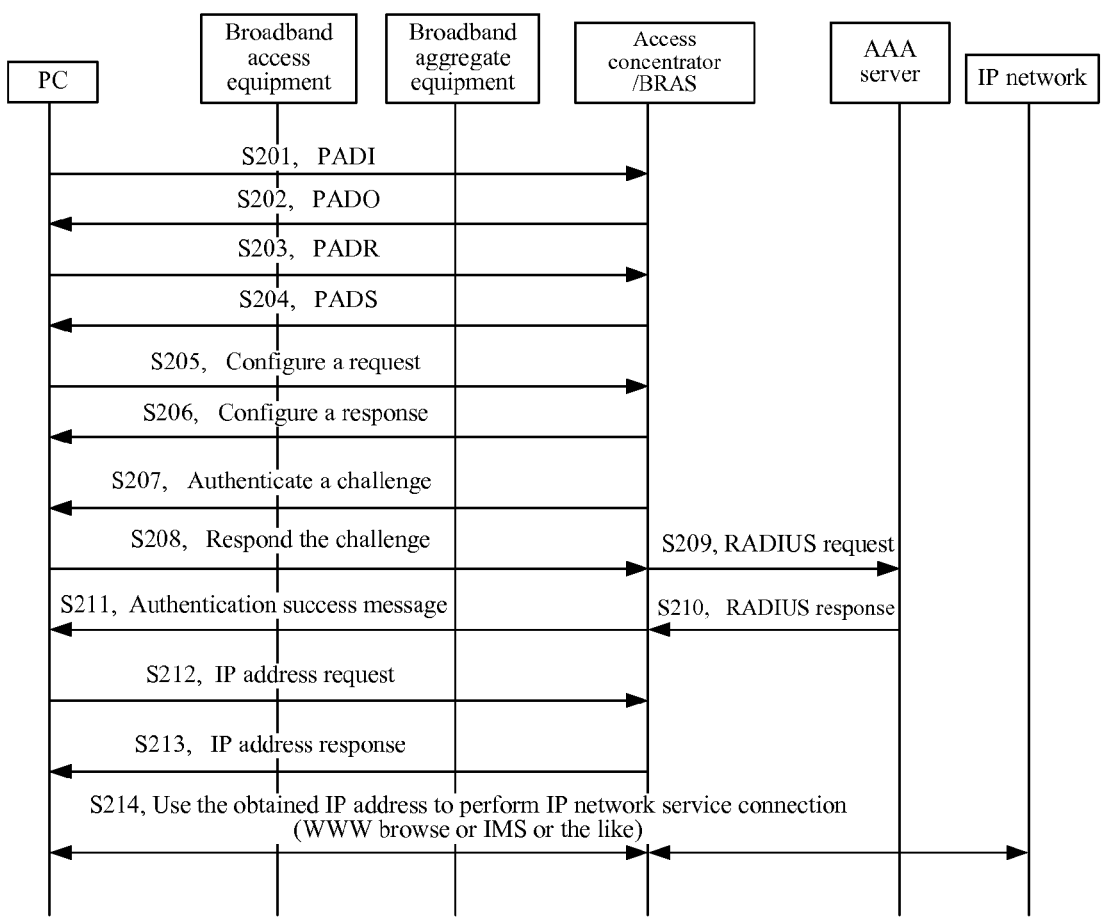
FIG. 2 illustrates a flow chart of PPPoE broadband network user authentication/IP address allocation in the related technologies.
Figure 3:
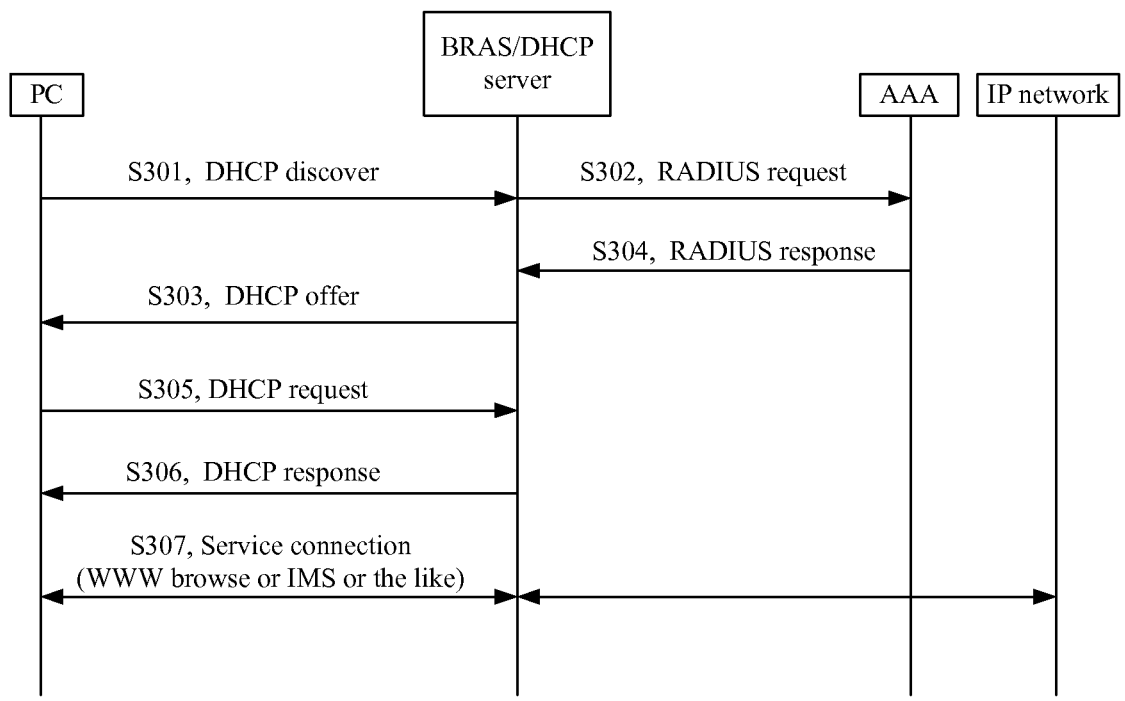
FIG. 3 illustrates a flow chart of IPoE broadband network user authentication/IP address allocation in the related technologies.
Figure 4:
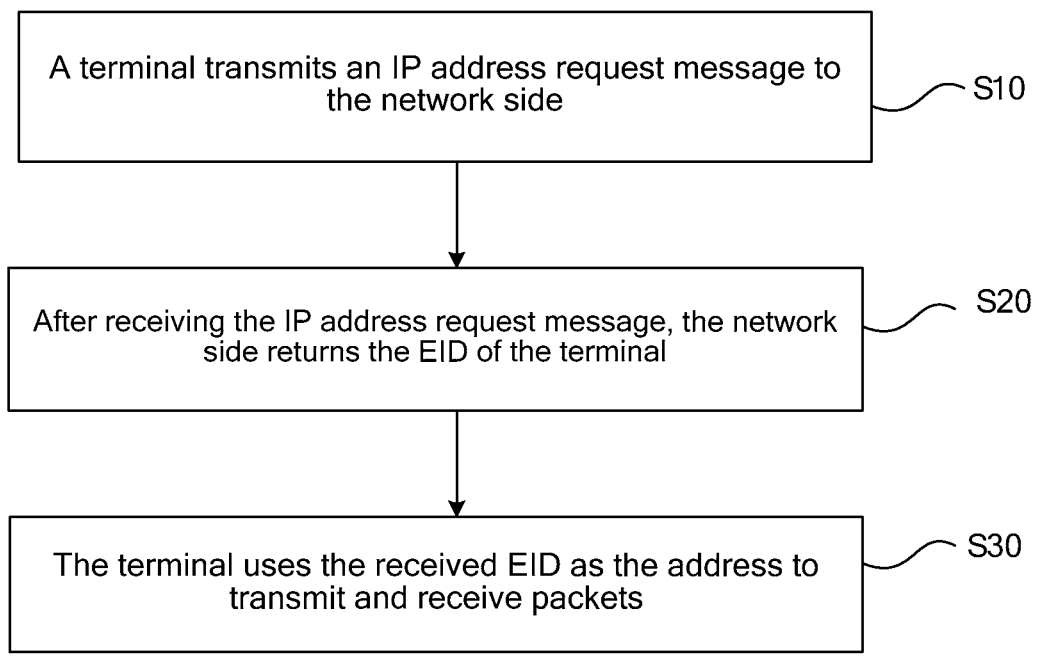
FIG. 4 illustrates a flow chart of an implementation method of a broadband network system according to embodiments of this disclosure.

FIG. 4 illustrates a flow chart of an implementation method of a broadband network system according to embodiments of this disclosure, comprising the following steps.

S10: A terminal transmits an IP address request message to the network side.

S20: After receiving the IP address request message, the network side returns the EID of the terminal.

S30: The terminal uses the received EID as the address to transmit and receive packets.

In this case, the EID may be national identification number, passport number, driver's license number, domain name system, defined numbering system, or telephone number of a user using the terminal. It is used for distinguishing the terminal uniquely.

In the embodiment, by applying the locator/ID separation conceptions into the fixed broadband network, relevant communication is implemented by non-IP-address EID. The problem that IP addresses are in shortage in the conventional art is solved. The application of this embodiment may greatly reduce the demands of IP addresses in a case of IP address shortage.

Preferably, before S10, the method further comprises the steps that: the terminal performs PPPoE user authentication with the network side, and passes the authentication; and S30 comprises the steps that: the terminal uses the received EID as the source address to perform EID packet encapsulation for the service data and perform PPPoE frame/packet encapsulation for the EID-encapsulated packet, and transmits the PPPoE-encapsulated frame/packet; a BRAS at the network side analyzes the received PPPoE-encapsulated frame/packet, and searches an RLOC address corresponding to the EID of the destination carried in the analyzed EID-encapsulated packet according to the corresponding relationship of EID/RLOC; the BRAS performs IP packet encapsulation for the EID-encapsulated packet according to the searched RLOC address, and transmits the IP-encapsulated IP packet.

Preferably, S30 further comprises the steps that: the BRAS receives the IP packet, identifies the IP packet as an EID-encapsulated packet, and analyzes the EID-encapsulated packet; the BRAS uses the destination EID of the EID packet to search the PPPoE session of the corresponding user, performs PPPoE frame encapsulation for the EID packet, and transmits the PPPoE-encapsulated frame; the terminal obtains the EID-encapsulated packet after receiving the PPPoE-encapsulated frame, and processes the obtained service data.

The above preferred embodiment provides a specific implementation solution in which the terminal uses the EID as its own address to transmit and receive data when PPPoE user authentication is performed.

Preferably, before S10, the method further comprises the steps that: the terminal performs PPPoE user authentication with the network side, and passes the authentication;

S20 comprises the steps that: the BRAS establishes an IP tunnel with a border tunnel router at the network side, and establishes a corresponding relationship between the IP tunnel and the PPPoE session ID;

S30 comprises the steps that: the terminal uses the received EID as the source address to perform EID packet encapsulation for the service data and perform PPPoE frame encapsulation for the EID-encapsulated packet, and transmits the PPPoE-encapsulated frame; the BRAS at the network side analyzes the received PPPoE-encapsulated frame to obtain the EID-encapsulated packet; the BRAS performs IP tunnel encapsulation for the EID-encapsulated packet correspondingly, and transmits the IP-tunnel-encapsulated packet to the border tunnel router; the border tunnel router analyzes the received IP-tunnel-encapsulated packet to obtain the EID-encapsulated packet, and searches the RLOC address corresponding to the EID of the destination carried in the EID-encapsulated packet according to the corresponding relationship of EID/RLOC; the border tunnel router performs IP packet encapsulation for the EID-encapsulated packet according to the searched RLOC address, and transmits the IP-encapsulated IP packet.

Preferably, S30 further comprises the steps that: the border tunnel router receives the IP packet, identifies the IP packet as an EID-encapsulated packet, and analyzes the EID-encapsulated packet; the border tunnel router uses the destination EID of the EID packet to search the corresponding IP tunnel, performs IP tunnel encapsulation for the EID packet, and then transmits the message to the BRAS; the BRAS analyzes the received IP-tunnel-encapsulated packet to obtain the EID packet; the BRAS uses the destination EID of the EID packet to search the PPPoE session of the corresponding user, performs PPPoE frame encapsulation for the EID packet, and transmits the PPPoE-encapsulated frame; the terminal obtains the EID-encapsulated packet after receiving the PPPoE-encapsulated frame, and processes the obtained service data.

The above preferred embodiment provides another specific implementation solution in which the terminal uses the EID (i.e., identifier) as its own address to transmit and receive data when PPPoE user authentication is performed.

Preferably, S10 comprises the steps that: the terminal transmits a DHCP discovery broadcast message to a DHCP server or BRAS at the network side;

S20 comprises the steps that: the BRAS performs ID authentication for the terminal after receiving the DHCP discovery broadcast message, and authenticates the terminal successfully;

S30 comprises the steps that: the terminal uses the received EID as the source address to perform EID packet encapsulation for the service data and perform VLAN frame/packet encapsulation for the EID-encapsulated packet according to the preconfigured VLAN, and transmits the VLAN-encapsulated frame/packet; the BRAS analyzes the received VLAN-encapsulated frame/packet, and searches the RLOC address corresponding to the EID of the destination carried in the analyzed EID-encapsulated packet according to the corresponding relationship of EID/RLOC; the BRAS performs IP packet encapsulation for the EID-encapsulated packet according to the searched RLOC address, and transmits the IP-encapsulated IP packet.

Preferably, S30 further comprises the steps that: the BRAS receives the IP packet, identifies the IP packet as an EID-encapsulated packet, and analyzes the EID-encapsulated packet; the BRAS uses the destination EID of the EID packet to search the corresponding VLAN-encapsulation information, performs VLAN frame encapsulation for the EID packet, and transmits the VLAN-encapsulated frame; after receiving the VLAN-encapsulated frame, the terminal obtains the EID-encapsulated packet, and processes the obtained service data.

The above preferred embodiment provides a specific implementation solution in which the terminal uses the EID as its own address to transmit and receive data when IPoE ID authentication is performed.

Preferably, S10 comprises the steps that: the terminal transmits a DHCP discovery broadcast message to a DHCP server or BRAS at the network side;

S20 comprises the steps that: the BRAS performs ID authentication for the terminal after receiving the DHCP discovery broadcast message, and authenticates the terminal successfully;

S30 comprises the steps that: the terminal uses the received EID as the source address to perform EID packet encapsulation for the service data and perform VLAN frame encapsulation for the EID-encapsulated packet according to the preconfigured VLAN, and transmits the VLAN-encapsulated frame; the BRAS analyzes the received VLAN-encapsulated frame to obtain the EID-encapsulated packet; the BRAS performs IP packet encapsulation for the EID-encapsulated packet according to the searched RLOC address, and transmits the IP-encapsulated packet to the border tunnel router; the BRAS analyzes the received IP-encapsulated packet to obtain the EID-encapsulated packet, and searches the RLOC address corresponding to the EID of the destination carried in the EID-encapsulated packet according to the corresponding relationship of EID/RLOC; the border tunnel router performs IP packet encapsulation for the EID-encapsulated packet according to the searched RLOC address, and transmits the IP-encapsulated IP packet.

Preferably, S30 further comprises the steps that: the border tunnel router receives the IP packet, identifies the IP packet as an EID-encapsulated packet, and analyzes the EID-encapsulated packet; the border tunnel router uses the destination EID of the EID packet to search the IP tunnel corresponding to the EID, performs IP tunnel encapsulation for the EID packet, and then transmits the message to the BRAS; the BRAS analyzes the received IP-tunnel-encapsulated packet, performs VLAN frame encapsulation for the analyzed EID-encapsulated packet, and transmits the VLAN-encapsulated frame; after receiving the VLAN-encapsulated frame, the terminal obtains the EID-encapsulated packet, and processes the obtained service data.

The above preferred embodiment provides another specific implementation solution in which the terminal uses the EID as its own address to transmit and receive data when IPoE solution based on DHCP is performed.

Preferably, the EID-encapsulated packet (i.e., EID packet) carries a source and destination address category indication field, and the source and destination address category indication field indicates the category of the packet.

Preferably, the DHCP server and the DNS support EID.

Optionally, the EID is pre-installed in the terminal. Specifically, the terminal does not need to return the EID of the user after passing the ID authentication; information, such as EID, corresponding to the user needs to be formed in BRAS; and the terminal performs interaction of service data with the EID.

Figure 5:
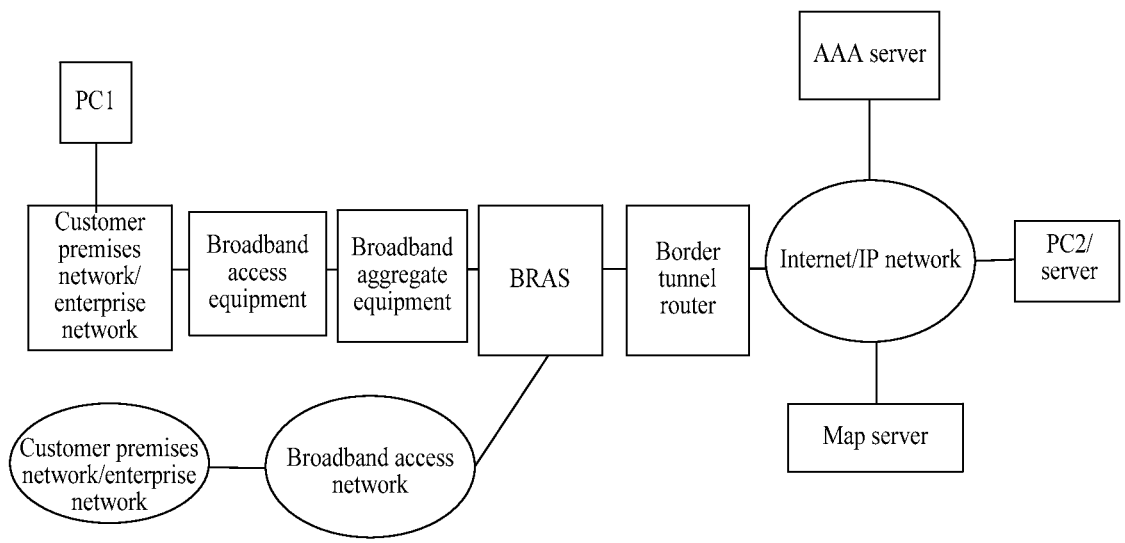
FIG. 5 illustrates a structure diagram of a broadband network according to preferred embodiments of this disclosure.

FIG. 5 illustrates a structure diagram of a broadband network according to preferred embodiments of this disclosure. To reduce the demands on IP addresses, a border tunnel router is introduced, and a map server function entity (corresponding to EID and RLOC) is introduced. In specific implementation, or in network deployment, the BRAS and the border tunnel router may be two independent equipments, and they also may be one equipment, i.e., function unification of the BRAS and the border tunnel router.

Preferred Embodiment 1

The Solution of Function Unification of the BRAS and the Border Tunnel Router

In the implementation solution, the BRAS/tunnel router and the client PC equipment support relevant locator/ID separation mechanism, and further need to implement relevant functions in the embodiment. Specifically, when the client performs IP address application allocation, a mechanism is needed to notify the client that no IP address is needed now and a specific EID is needed for communication. About the selection and definition of EID, there may be many solutions, for example, telephone number may be used for communication, or national identification number, passport number, driver's license number or the like may be used for communication, or unique definition (for example, a new numbering mechanism formulated by the operator according to policies, similar to the definition of the domain name system) is performed according to relevant contents. Which one of these is specifically selected will not affect the effectiveness and adaptability of the method in this disclosure. In this way, no IP addresses are needed. To support the communication of EID, the category of EID needs to be updated in DNS, that is, the DNS system should support corresponding to EID through the domain name system.

Figure 6:
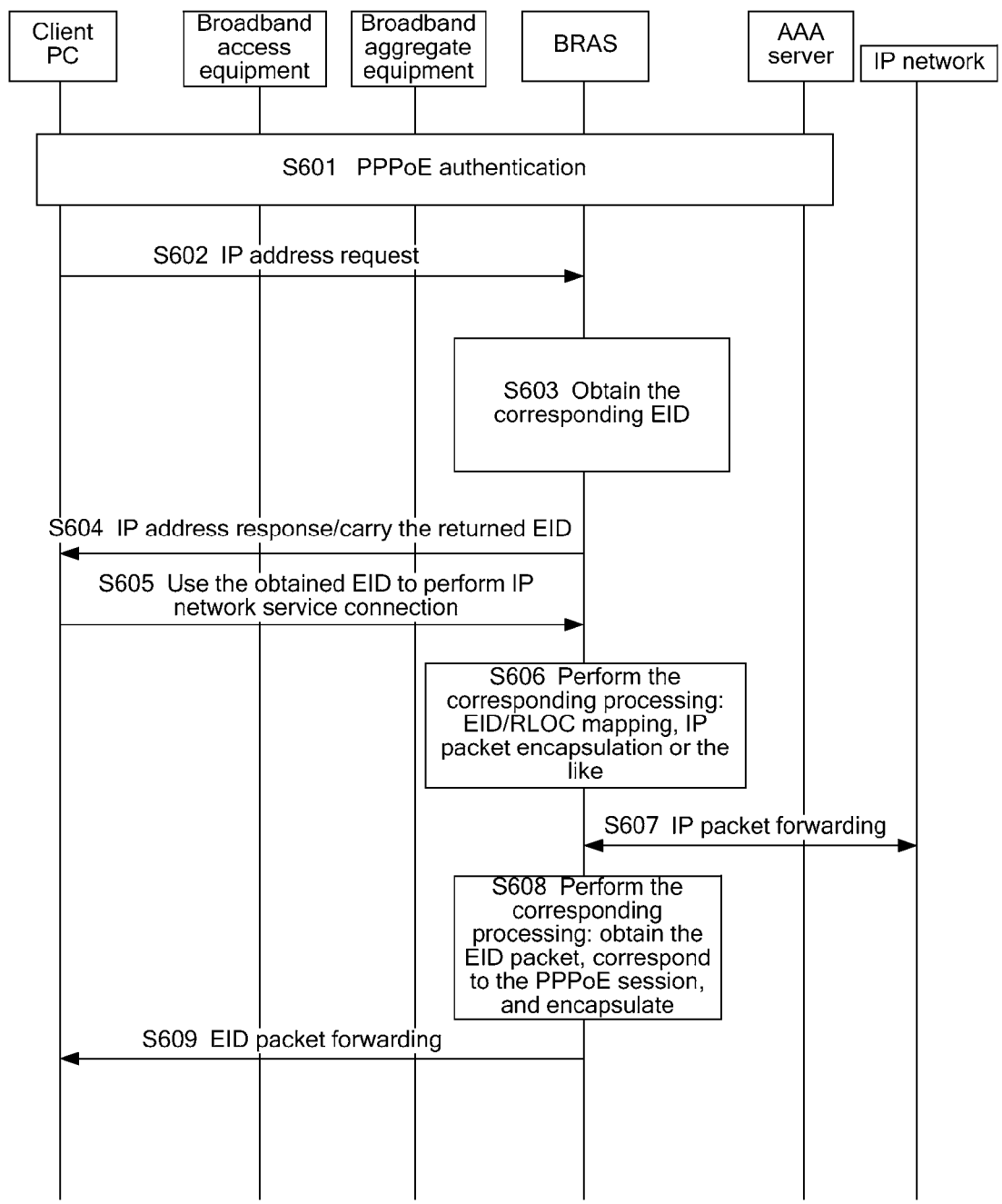
FIG. 6 illustrates a flow chart of the key process of function unification of a BRAS and a border tunnel router according to preferred embodiment 1 of this disclosure.

FIG. 6 illustrates a flow chart of the key process according to preferred embodiment 1 of this disclosure (here, take PPPoE as example), comprising the following steps.

S601: The PPPoE client PC performs PPPoE authentication; and this process comprises the following steps.

1) PC transmits a PADI packet.

2) After receiving the PADI packet within the serving range, the access concentrator (BRAS) transmits a PADO packet to respond the request.

3) The PC selects one proper PADO packet from a plurality of possibly received PADO packets, and then transmits a PADR packet to the selected access concentrator.

4) After receiving the PADR packet, the access concentrator gets ready to start a PPP session, transmits a PADS packet, and allocates and returns a (PPPoE) session ID.

5) The PC transmits a configuration request including the maximum message scale and authentication way or the like.

6) A response is configured, to implement the purpose defined by the line feature.

7) The BRAS initiates an authentication challenge.

8) The PPPoE client responds the challenge.

9) The BRAS transmits a RADIUS message to an AAA server, for user ID authentication.

10) The BRAS receives an RADIUS response.

11) After passing the authentication, the BRAS transmits an authentication success message to the PPPoE client.

S602: The client PC applies for an IP address from the BRAS.

S603: After receiving the IP address request, as the BRAS supports the locator/ID separation mechanism, it knows that it does not need to allocate an IP address; instead it needs to obtain an (generated/defined in advance) EID (i.e., identifier, not IP address; it is related to the security information of the user, for example, International Mobile Subscriber Identity IMSI, or user name/password or the like, corresponding to a certain specific feature). The specific contents may be the telephone number corresponding to the user, or one other numerical value that can uniquely confirm the user identity, for example, national identification number, passport number, driver's license number, domain name system, or defined numbering system, which is used for distinguishing the terminal uniquely. During the subsequent bearing establishment, corresponding relationship needs to be established, and thereby forwarding is performed. The EID is determined by the operator itself according to own need and uniformly used in the management domain, further interaction with other operators may be implemented, for example, roaming service or the like. The specific implementation solution of EID may be that a unique corresponding EID is generated when the user opens an account, and the EID is stored. BRAS may obtain the related information of the EID by means of searching. Specifically, the EID information may be stored in the AAA server or the like, and also may be stored in a specific server independently.

S604: The BRAS transmits an address response message and returns the EID of the user in the message.

S605: The client uses the obtained EID as the source address to perform packet encapsulation of IP network service connection (WWW browse or IMS or the like). The destination EID is the EID of the destination to be communicated. During the specific implementation, as there is a possibility that EID and IP address serve as the destination address, the message transmitted by the client needs a source and destination address category indication field of the message, so that the network can process the message flexibly and correctly.

The message forwarding between the client and the BRAS is by PPPoE frame encapsulation and transmitting.

S606: The BRAS performs corresponding processing. First, it is necessary to analyze the packet of the EID encapsulation from the PPPoE frame encapsulation. For the packet, the main function is to search the RLOC address corresponding to the destination EID according to the corresponding relationship of EID/RLOC, and to perform IP packet encapsulation according to the search result. The specific implementation flow may have many implementation solutions, for example, implementation of Alternative Logic Topology (ALT) of LISP+Map Server (MS), or relevant intercommunication mechanism or the like. Specifically, after receiving the EID packet encapsulation, the BRAS transmits a destination EID/RLOC analysis request to the MS to obtain the RLOC/IP address corresponding to the destination EID. The MS cooperates with the related border tunnel router in the network, to implement the analysis from EID to RLOC and return the corresponding RLOC.

S607: Connection and forwarding in the IP network are implemented through the IP packet.

S608: For the returned IP packet, an inversion process is needed. The BRAS may know that the message is an EID packet through the category of the packet. Therefore relevant decapsulation operations have to be made to obtain the EID-encapsulated packet/message.

S609: The BRAS further needs to search the corresponding PPPoE session through the destination EID, perform PPPoE encapsulation (generally, Ethernet frame) for the EID-encapsulated packet, and transmits it to the relevant client. The client performs relevant decapsulation for the message (/frame), and forwards it to the upper stratum of the protocol stack for processing, in order to implement the service.

Preferred Embodiment 2

Solution of Function Separation of the BRAS and the Border Tunnel Router

In preferred embodiment 1, functions of the BRAS and the border tunnel router supporting the locator/ID separation mechanism are unified. Although the structure of the network can be simplified, consideration should also be paid to that the BRAS equipment in the existing network deployment may be difficult to support the locator/ID separation, separation/independent deployment of the border tunnel router and the BRAS may be taken into consideration. The specific implementation is as shown in FIG. 5. The border tunnel router is deployed after the BRAS.

Figure 7:
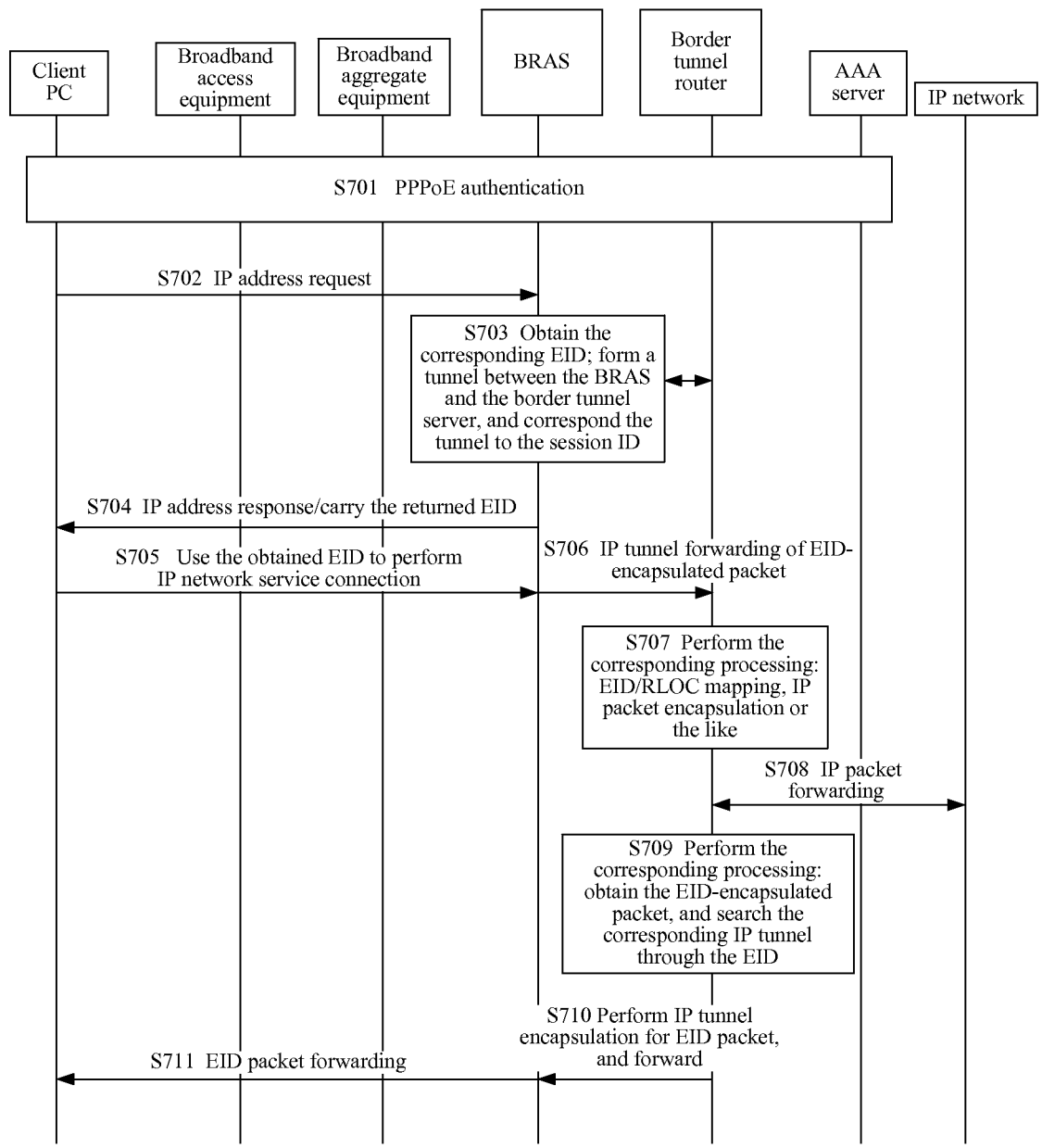
FIG. 7 illustrates a flow chart of the key process of function separation of a BRAS and a border tunnel router according to preferred embodiment 2 of this disclosure.

FIG. 7 illustrates a flow chart of the key process of function separation of a border tunnel router and a BRAS according to preferred embodiment 2 of this disclosure (here, take PPPoE as example), comprising the following steps.

S701: Identical to S601.

S702: The PPPoE client PC applies an IP address from the BRAS.

S703: After receiving the IP address request, as the BRAS supports the locator/ID separation mechanism, it knows that it does not need to allocate an IP address, and instead it needs to obtain an (generated/defined in advance) EID (i.e., identifier, instead of IP address, related to the security information of the user, for example, International Mobile Subscriber Identity IMSI, or user name/password or the like, corresponding to a certain specific feature). The specific contents may be the telephone number corresponding to the user, or one other numerical value that can uniquely confirm the user identity, for example, national identification number, passport number, driver's license number, domain name system, or defined numbering system, which is used for distinguishing the terminal uniquely. During the subsequent bearing establishment, correspondence has to be performed, and thereby forwarding is performed. The EID is determined by the operator itself according to own need and uniformly used in the management domain, further interaction with other operators may be implemented, for example, roaming service or the like. The specific implementation solution of EID may be that, a unique corresponding EID is generated when the user opens an account, and the EID is stored. BRAS may obtain the related information of the EID by means of searching.

In order to forward an EID-encapsulated packet, it is necessary to form an (IP) tunnel between the BRAS and the border tunnel router, and this tunnel may be a General Routing Encapsulation (GRE) tunnel and also may be other IP tunnels. Furthermore, a corresponding relationship between the tunnel and the (PPPoE) session ID at the broadband access network is established to implement the forwarding of the EID-encapsulated packet.

S704: The BRAS transmits an address response message and returns the EID of the user in the message.

S705: The client uses the obtained EID as the source address to perform packet encapsulation of IP network service connection (WWW browse or IMS or the like). The destination EID is the EID of the destination to be communicated. As there is a possibility that EID and IP address serve as the destination address, the message transmitted by the client needs a source and destination address category indication field of the message, so that the network can process the message flexibly and correctly.

The packet forwarding between the client and the BRAS is by PPPoE frame encapsulation and transmitting.

S706: The BRAS analyzes the packet of the EID encapsulation from the PPPoE frame encapsulation, performs the corresponding IP tunnel encapsulation for the EID-encapsulated packet, and forwards the message.

S707: The border tunnel router performs corresponding processing. First, it is necessary to analyze the packet of the EID encapsulation from the tunnel encapsulation. In allusion to the packet, the main function is to search the RLOC address corresponding to the EID according to the corresponding relationship of EID/RLOC, and to perform IP packet encapsulation according to the search result. The specific implementation flow may have many implementation solutions, for example, implementation of ALT of LISP+MS, relevant intercommunication mechanism or the like. Specifically, after receiving the EID packet encapsulation, the border tunnel router transmits a destination EID/RLOC analysis request to the MS to obtain the RLOC/IP address corresponding to the destination EID. The MS cooperates with the related tunnel router in the network, to implement the analysis from EID to RLOC and return the corresponding RLOC.

S708: Connection and forwarding in the IP network are implemented through the IP packet.

S709: For the returned IP packet, an inversion process is needed. The border tunnel router may know that the message is a locator/ID separation encapsulated message through the category of the packet, therefore relevant decapsulation operations have to be made to obtain the EID-encapsulated packet/message. Furthermore, the corresponding IP tunnel is obtained through the destination EID of the EID packet.

S710: The border tunnel router performs IP tunnel encapsulation for the EID-encapsulated packet, and transmits it to the BRAS.

S711: The BRAS decapsulates the EID-encapsulated packet from the IP tunnel, performs encapsulation for the broadband network access side, specifically through the PPPoE session ID encapsulation, and transmits it to the relevant client. The client performs relevant decapsulation for the message, and forwards it to the upper stratum of the protocol stack for processing, in order to implement the service.

Above preferred embodiment 1 and preferred embodiment 2 only describe the specific processing flow when PPPoE is taken as example. It should be noted that, this disclosure also may be implemented with authentication solutions such as IPoE. Specifically, when the DHCP applies for an IP address, what is returned in this disclosure is an EID instead of IP address. And the PC uses this EID to perform service connection. The specific network structure and processing way are identical to embodiment 1 and embodiment 2 described herein. It should be specially noted that, the DHCP has different requirements in the network deployment, for example, it has solutions such as DHCP relay and DHCP proxy, but the result of allocation of IP addresses is consistent and will not influence the solution described herein. The protocol and flow of DHCP have to be extended to support EID. The specific implementation aspect, the DHCP address application request may be intercepted by the BRAS, and the corresponding EID information may be allocated by the AAA server. The specific corresponding relationship may be determined through relevant information, such as username/password and VLAN connection configured for the user. This VLAN may be configured to uniquely determine the user.

Compared with the PPPoE solution, the packet encapsulation and forwarding of IPoE in the broadband access network are implemented by the above mentioned VLAN, corresponding to the PPPoE session ID. Similarly, the corresponding relationship of IP tunnel and session ID also changes to the corresponding relationship of IP tunnel and VLAN. The specific process is similar, which will not be described in detail herein.

Preferred Embodiment 3

Implementation Solution in Which the EID is Pre-Installed in the Terminal

According to the policy arrangement, the EID of the user/terminal may be pre-installed in the terminal, for example, stored through equipment such as smart card. The specific process may comprise the steps that: the user opens an account in the operator network, the operator allocates one or more EIDs for the user and issues them to the user through hardware storage equipment, and the user installs the equipment in the terminal equipment. In the service flow aspect, the specific process comprises the steps that: the user needs to pass through the ID authentication (The ID authentication may be PPPoE, IPoE or other ID authentication methods. No EID needs to be returned in a case that the EID is pre-installed in the terminal); relevant user information including EID of the user is formed in the BRAS through the authentication process; the terminal performs interaction of service data through the EID. During the interaction process, corresponding message processing flows are employed according to the specific authentication way. Specifically, for the PPPoE or IPoE flow, reference can be made to the methods described in embodiment 1 and embodiment 2.

Figure 8:
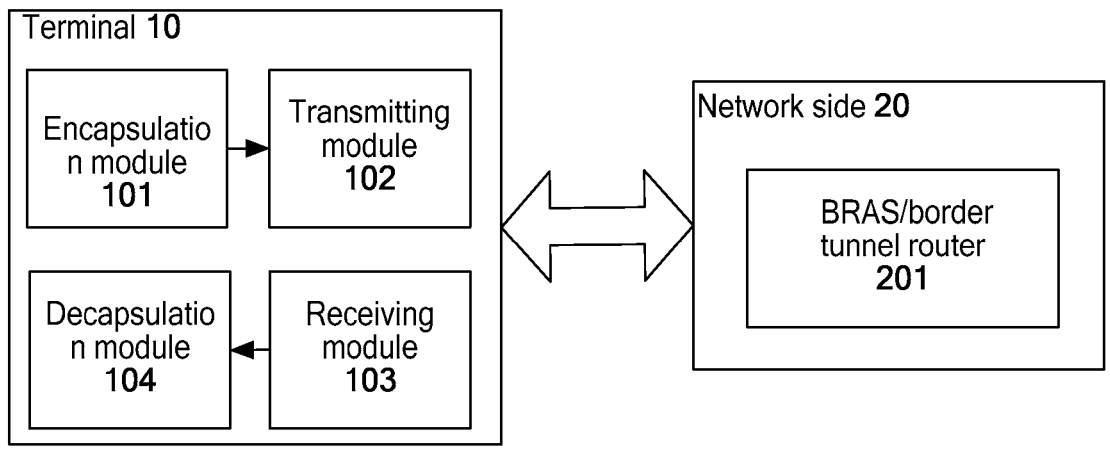
FIG. 8 illustrates a diagram of a broadband network system according to preferred embodiment 1 of this disclosure.
Figure 9:
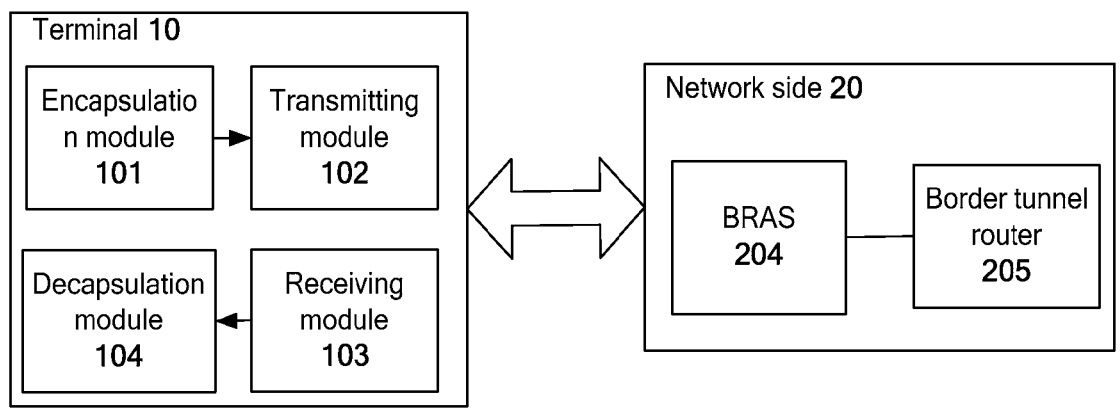
FIG. 9 illustrates a diagram of a broadband network system according to preferred embodiment 2 of this disclosure.

FIG. 8 illustrates a diagram of a broadband network system according to embodiment 1 of this disclosure, and FIG. 9 illustrates a diagram of a broadband network system according to embodiment 2 of this disclosure.

As shown in FIG. 8 and FIG. 9, the broadband network system comprises: a terminal 10, configured to transmit an IP address request message to the network side; and further configured to use the received EID as the address to transmit and receive packets; the network side 20, configured to return the EID of the terminal after receiving the IP address request message.

Preferably, as shown in FIG. 8, the terminal 10 is further configured to perform PPPoE user authentication with the network side 20 and pass the authentication;

the terminal 10 comprises: an encapsulation module 101, configured to use the received EID as the source address to perform EID packet encapsulation for the service data and perform PPPoE frame encapsulation for the EID-encapsulated packet; and a transmitting module 102, configured to transmit the PPPoE-encapsulated frame;

the network side 20 comprises: a BRAS/border tunnel router 201;

the BRAS/border tunnel router 201 is configured to receive the PPPoE-encapsulated frame, and analyze the PPPoE-encapsulated frame to obtain the EID-encapsulated packet; and the BRAS/border tunnel router 201 is configured to search an RLOC address corresponding to the EID of the destination carried in the analyzed EID-encapsulated packet according to the corresponding relationship of EID/RLOC; and is further configured to perform IP packet encapsulation for the EID-encapsulated packet according to the searched RLOC address, and transmit the IP-encapsulated IP packet.

Preferably, the BRAS/border tunnel router 201 is further configured to receive the IP packet, identify the IP packet as an EID-encapsulated packet, and analyze the EID-encapsulated packet;

the BRAS/border tunnel router 201 is further configured to use the destination EID of the EID packet to search the PPPoE session of the corresponding user, perform PPPoE frame encapsulation for the EID packet, and transmit the PPPoE-encapsulated frame; and the terminal 10 further comprises: a receiving module 103, configured to obtain the EID-encapsulated packet after receiving the PPPoE-encapsulated frame; and a decapsulation module 104, configured to decapsulate the specific service data from the EID-encapsulated packet, and delivery the specific service data to the specific application.

This preferred embodiment provides a specific implementation solution in which the terminal uses the EID to transmit and receive data when PPPoE user authentication is performed.

Preferably, as shown in FIG. 9, the terminal 10 is further configured to perform PPPoE user authentication with the network side 20 and pass the authentication;

the terminal 10 comprises: an encapsulation module 101, configured to use the received EID as the source address to perform EID packet encapsulation for the service data and perform PPPoE frame encapsulation for the EID-encapsulated packet;

a transmitting module 102, configured to transmit the PPPoE-encapsulated frame;

the network side 20 comprises: a BRAS 201 and a border tunnel router 202;

the BRAS 201 is configured to establish an IP tunnel with the border tunnel router at the network side, and establish a corresponding relationship between the IP tunnel and the PPPoE session ID; further configured to analyze the received PPPoE-encapsulated frame to obtain the EID-encapsulated packet; further configured to perform IP tunnel encapsulation for the EID-encapsulated packet correspondingly, and transmit the IP-tunnel-encapsulated packet to the border tunnel router 202; and the border tunnel router 202 is configured to analyze the received IP-tunnel-encapsulated packet to obtain the EID-encapsulated packet, and search the RLOC address corresponding to the EID of the destination carried in the EID-encapsulated packet according to the corresponding relationship of EID/RLOC; further configured to perform IP packet encapsulation for the EID-encapsulated packet according to the searched RLOC address, and transmit the IP-encapsulated IP packet.

Preferably, the border tunnel router 202 is further configured to receive the IP packet, identify the IP packet as an EID-encapsulated packet, and analyze the EID-encapsulated packet; further configured to use the destination EID of the EID packet to search the corresponding IP tunnel, perform IP tunnel encapsulation for the EID packet, and then transmit the message to the BRAS 201;

the BRAS 201 is further configured to analyze the received IP-tunnel-encapsulated packet to obtain the EID-encapsulated packet; further configured to use the destination EID of the EID packet to search the PPPoE session of the corresponding user, perform PPPoE frame encapsulation for the EID packet, and transmit the PPPoE-encapsulated frame; and the terminal 10 further comprises: a receiving module 103, configured to obtain the EID-encapsulated packet after receiving the PPPoE-encapsulated frame; and a decapsulation module 104, configured to decapsulate the specific service data from the EID-encapsulated packet, and delivery the specific service data to the specific application.

The preferred embodiment provides a specific implementation solution in which the terminal uses the EID to transmit and receive data when PPPoE user authentication is performed.

Preferably, the network systems, as shown in FIG. 8 and FIG. 9, are also applicable to DHCP/IPoE authentication. For contents of the specific flows and encapsulations, reference can be made to the PPPoE flow. For the corresponding relationship of the VLAN/PPPoE session ID or the like, reference can be made to the descriptions in the foregoing preferred embodiments.

In conclusion, in the embodiments of this disclosure, by means of applying the locator/ID separation conceptions into the fixed broadband network, the problem of resource waste caused by indication of EID by IP address due to the shortage of IP addresses in the related technologies is solved. The demands of the broadband network on the IP address are reduced. Therefore a new direction of network evolution is provided.

Of course, those skilled in the art should understand that the above modules or steps of this disclosure could be achieved through general calculating devices. They can be concentrated in a single calculating device or distributed in a network formed by multiple calculating devices. Optionally, they can be achieved by program codes that can be executed by calculating devices. Thus, they can be stored in storage devices to be executed by calculating devices. And under certain situation, the shown or described steps can be executed according to an order different from the above order. Or they can be achieved by respectively making them into many integrated circuit modules or by making multiple modules or steps among them into a single integrated circuit module. In this way, this disclosure is not limited to combinations of any specific hardware and software.

Above contents are only preferred embodiments of this disclosure and are not used for limiting this disclosure. For those skilled in the art, this disclosure may have various alternations and changes. Any modifications, equivalent replacements and improvements within the spirit and principle of this disclosure should be contained within the protection scope of this disclosure.

What is claimed is:

1. An implementation method of a broadband network system, comprising:
    a terminal transmitting an IP address request message to a network side;
    after receiving the IP address request message, the network side returning a non-IP-address Endpoint Identifier (EID) of the terminal; and
    the terminal using the received EID as an address to transmit and receive packets,
    wherein the EID of the terminal comprises at least one of: national identification number, passport number, driver's license number, domain name system number, defined numbering system, and telephone number of a user using the terminal,
    wherein
    before the terminal transmitting the IP address request message to the network side, the method further comprises:
    the terminal performing PPP over Ethernet (PPPoE) user authentication with the network side, and passing the authentication;
    and
    the terminal using the received EID as the address to transmit and receive the packets comprises:
    the terminal using the received EID as a source address to perform EID packet encapsulation for service data, performing PPPoE frame encapsulation for the EID-encapsulated packet, and transmitting the PPPoE-encapsulated frame;
    a Broadband Remote Access Server (BRAS) at the network side analyzing the received PPPoE-encapsulated frame, and searching a Routing Locator (RLOC) address corresponding to a destination EID carried in the analyzed EID-encapsulated packet according to the corresponding relationship of EID/RLOC; and
    the BRAS performing IP packet encapsulation for the EID-encapsulated packet according to the searched RLOC address, and transmitting the IP-encapsulated IP packet.

2. The method according to claim 1, wherein the terminal using the received EID as the address to transmit and receive the packets further comprises:
    the BRAS receiving the IP packet, identifying the IP packet as an EID-encapsulated packet, and analyzing the EID-encapsulated packet;
    the BRAS using the destination EID of the EID packet to search a PPPoE session of corresponding user, performing PPPoE frame encapsulation for the EID packet, and transmitting the PPPoE-encapsulated frame; and
    the terminal obtaining the EID-encapsulated packet after receiving the PPPoE-encapsulated frame, and processing the obtained service data.

3. The method according to claim 2, wherein the EID-encapsulated packet carries a source and destination address category indication field, and the source and destination address category indication field indicates category of the packet;
    or,
    the DHCP server and the Domain Name Server (DNS) support EID;
    or,
    the EID is pre-installed in the terminal.

4. The method according to claim 1, wherein,
    before the terminal transmitting the IP address request message to the network side, the method further comprises:

the terminal performing the PPPoE user authentication with the network side, and passing the authentication;
the network side returning the EID of the terminal after receiving the IP address request message comprises:
the BRAS establishing an IP tunnel with a border tunnel router at the network side, and establishing a corresponding relationship between the IP tunnel and a PPPoE session ID;
and
the terminal using the received EID as the address to transmit and receive the packets comprises:
the terminal using the received EID as the source address to perform EID packet encapsulation for the service data, performing PPPoE frame encapsulation for the EID-encapsulated packet, and transmitting the PPPoE-encapsulated frame;
the BRAS analyzing the received PPPoE-encapsulated frame to obtain the EID-encapsulated packet;
the BRAS performing IP tunnel encapsulation for the EID-encapsulated packet correspondingly, and transmitting the IP-tunnel-encapsulated packet to the border tunnel router;
the border tunnel router analyzing the received IP-tunnel-encapsulated packet to obtain the EID-encapsulated packet, and searching the RLOC address corresponding to the destination EID carried in the EID-encapsulated packet according to the corresponding relationship of EID/RLOC; and
the border tunnel router performing IP packet encapsulation for the EID-encapsulated packet according to the searched RLOC address, and transmitting the IP-encapsulated IP packet.

5. The method according to claim 4, wherein the terminal using the received EID as the address to transmit and receive the packets further comprises:
the border tunnel router receiving the IP packet, identifying the IP packet as an EID-encapsulated packet, and analyzing the EID-encapsulated packet;
the border tunnel router using the destination EID of the EID packet to search a corresponding IP tunnel, performing IP tunnel encapsulation for the EID packet, and then transmitting the packet to the BRAS;
the BRAS analyzing the received IP-tunnel-encapsulated packet to obtain the EID packet;
the BRAS using the destination EID of the EID packet to search the PPPoE session of the corresponding user, performing PPPoE frame encapsulation for the EID packet, and transmitting the PPPoE-encapsulated frame; and
the terminal obtaining the EID-encapsulated packet after receiving the PPPoE-encapsulated frame, and processing the obtained service data.

6. The method according to claim 4, wherein the EID-encapsulated packet carries a source and destination address category indication field, and the source and destination address category indication field indicates category of the packet;
or,
the DHCP server and the Domain Name Server (DNS) support EID;
or,
the EID is pre-installed in the terminal.

7. The method according to claim 1, wherein the EID-encapsulated packet carries a source and destination address category indication field, and the source and destination address category indication field indicates category of the packet;
or,
the DHCP server and the Domain Name Server (DNS) support EID;
or,
the EID is pre-installed in the terminal.

8. An implementation method of a broadband network system, comprising:
a terminal transmitting an IP address request message to a network side;
after receiving the IP address request message, the network side returning a non-IP-address Endpoint Identifier (EID) of the terminal; and
the terminal using the received EID as an address to transmit and receive packets,
herein the EID of the terminal comprises at least one of: national identification number, passport number, driver's license number, domain name system number, defined numbering system, and telephone number of a user using the terminal,
herein
the terminal transmitting the IP address request message to the network side comprises:
the terminal transmitting a Dynamic Host Configuration Protocol (DHCP) discovery broadcast message to a DHCP server or a BRAS at the network side;
the network side returning the EID of the terminal after receiving the IP address request message comprises:
the BRAS performing ID authentication for the terminal after receiving the DHCP discovery broadcast message, and authenticating the terminal successfully;
and
the terminal using the received EID as the address to transmit and receive the packets comprises:
the terminal using the received EID as a source address to perform EID packet encapsulation for service data, performing Virtual Local Area Network (VLAN) frame encapsulation for the EID-encapsulated packet according to a preconfigured VLAN, and transmitting the VLAN-encapsulated frame;
the BRAS analyzing the received VLAN-encapsulated frame, and searching the RLOC address corresponding to a destination EID carried in the analyzed EID-encapsulated packet according to a corresponding relationship of EID/RLOC; and
the BRAS performing IP packet encapsulation for the EID-encapsulated packet according to the searched RLOC address, and transmitting the IP-encapsulated IP packet.

9. The method according to claim 8, wherein the terminal using the received EID as the address to transmit and receive the packets further comprises:
the BRAS receiving the IP packet, identifying the IP packet as an EID-encapsulated packet, and analyzing the EID-encapsulated packet;
the BRAS using the destination EID of the EID packet to search the corresponding VLAN-encapsulation information, performing VLAN frame encapsulation for the EID packet, and transmitting the VLAN-encapsulated frame; and
the terminal obtaining the EID-encapsulated packet after receiving the VLAN-encapsulated frame, and processing the obtained service data.

10. The method according to claim 8, wherein the EID-encapsulated packet carries a source and destination address category indication field, and the source and destination address category indication field indicates category of the packet;

or, the DHCP server and the Domain Name Server (DNS) support EID;

or, the EID is pre-installed in the terminal.

11. An implementation method of a broadband network system, comprising:
  a terminal transmitting an IP address request message to a network side;
  after receiving the IP address request message, the network side returning a non-IP-address Endpoint Identifier (EID) of the terminal; and
  the terminal using the received EID as an address to transmit and receive packets,
  herein the EID of the terminal comprises at least one of: national identification number, passport number, driver's license number, domain name system number, defined numbering system, and telephone number of a user using the terminal,
  herein
  the terminal transmitting an IP address request message to the network side comprises:
  the terminal transmitting a DHCP discovery broadcast message to a DHCP server or a BRAS at the network side;
  the network side returning the EID of the terminal after receiving the IP address request message comprises:
  the BRAS performing ID authentication for the terminal after receiving the DHCP discovery broadcast message, and authenticating the terminal successfully; and
  the BRAS establishing an IP tunnel with a border tunnel router at the network side, and establishing a corresponding relationship between the IP tunnel and the preconfigured VLAN;
  and
  the terminal using the received EID as the address to transmit and receive the packets comprises:
  the terminal using the received EID as a source address to perform EID packet encapsulation for the service data, performing VLAN frame encapsulation for the EID-encapsulated packet according to a preconfigured VLAN, and transmitting the VLAN-encapsulated frame;
  the BRAS analyzing the received VLAN-encapsulated frame to obtain the EID-encapsulated packet;
  the BRAS performing corresponding IP tunnel encapsulation for the EID-encapsulated packet, and transmitting the IP-tunnel-encapsulated packet to the border tunnel router;
  the border tunnel router analyzing the received IP-tunnel-encapsulated packet to obtain the EID-encapsulated packet, and searching the RLOC address corresponding to the destination EID carried in the EID-encapsulated packet according to the corresponding relationship of EID/RLOC; and
  the border tunnel router performing IP packet encapsulation for the EID-encapsulated packet according to the searched RLOC address, and transmitting the IP-encapsulated IP packet.

12. The method according to claim 11, wherein the terminal using the received EID as the address to transmit and receive the packets further comprises:

the border tunnel router receiving the IP packet, identifying the IP packet as an EID-encapsulated packet, and analyzing the EID-encapsulated packet;
the border tunnel router using the destination EID of the EID packet to search the IP tunnel corresponding to the EID, performing IP tunnel encapsulation for the EID packet, and then transmitting the packet to the BRAS;
the BRAS analyzing the received IP-tunnel-encapsulated packet, performing VLAN frame encapsulation for the analyzed EID-encapsulated packet, and transmitting the VLAN-encapsulated frame; and
the terminal obtaining the EID-encapsulated packet after receiving the VLAN-encapsulated frame, and processing the obtained service data.

13. The method according to claim 11, wherein the EID-encapsulated packet carries a source and destination address category indication field, and the source and destination address category indication field indicates category of the packet;

or, the DHCP server and the Domain Name Server (DNS) support EID;

or, the EID is pre-installed in the terminal.

14. A broadband network system, comprising:
  a terminal, configured to transmit an IP address request message to a network side; and further configured to use a received EID as an address to transmit and receive packets; and
  the network side, configured to return the EID of the terminal after receiving the IP address request message,
  wherein the terminal is further configured to perform PPPoE user authentication with the network side and pass the authentication; and the terminal comprises:
  an encapsulation module, configured to use the received EID as a source address to perform EID packet encapsulation for service data and perform PPPoE frame encapsulation for the EID-encapsulated packet; and
  a transmitting module, configured to transmit the PPPoE-encapsulated frame;
  and
  the network side comprises: a Broadband Remote Access Server (BRAS)/border tunnel router;
  the BRAS/border tunnel router being configured to receive the PPPoE-encapsulated frame, and analyze the PPPoE-encapsulated frame to obtain the EID-encapsulated packet; and search an RLOC address corresponding to a destination EID carried in the analyzed EID-encapsulated packet according to the corresponding relationship of EID/RLOC; and further configured to perform IP packet encapsulation for the EID-encapsulated packet according to the searched RLOC address, and transmit the IP-encapsulated IP packet.

15. The system according to claim 14, wherein,
the BRAS/border tunnel router is further configured to receive the IP packet, identify the IP packet as an EID-encapsulated packet, and analyze the EID-encapsulated packet;
the BRAS/border tunnel router is further configured to use the destination EID of the EID packet to search a PPPoE session of a corresponding user, perform PPPoE frame encapsulation for the EID packet, and transmit the PPPoE-encapsulated frame; and
the terminal further comprises: a receiving module, configured to obtain the EID-encapsulated packet after receiving the PPPoE-encapsulated frame; and a decapsulation module, configured to decapsulate specific service data from the EID-encapsulated packet, and delivery the specific service data to specific application.

16. A broadband network system, comprising:

a terminal, configured to transmit an IP address request message to a network side; and further configured to use a received EID as an address to transmit and receive packets; and the network side, configured to return the EID of the terminal after receiving the IP address request message, wherein the terminal is further configured to perform PPPoE user authentication with the network side and pass the authentication; and the terminal comprises:

an encapsulation module, configured to use the received EID as the source address to perform EID packet encapsulation for service data and perform PPPoE frame encapsulation for the EID-encapsulated packet; and a transmitting module, configured to transmit the PPPoE-encapsulated frame;

and the network side comprises: a BRAS and a border tunnel router;

the BRAS being configured to establish an IP tunnel with the border tunnel router at the network side, and establish a corresponding relationship between the IP tunnel and the PPPoE session ID; and is further configured to analyze the received PPPoE-encapsulated frame to obtain the EID-encapsulated packet; and is further configured to perform IP tunnel encapsulation for the EID-encapsulated packet correspondingly, and transmit the IP-tunnel-encapsulated packet to the border tunnel router; and the border tunnel router is configured to analyze the received IP-tunnel-encapsulated packet to obtain the EID-encapsulated packet, and search the RLOC address corresponding to the destination EID carried in the EID-encapsulated packet according to the corresponding relationship of EID/RLOC; and is further configured to perform IP packet encapsulation for the EID-encapsulated packet according to the searched RLOC address, and transmit the IP-encapsulated IP packet.

17. The system according to claim 16, wherein, the border tunnel router is further configured to receive the IP packet, identify the IP packet as an EID-encapsulated packet, and analyze the EID-encapsulated packet; and is further configured to use the destination EID of the EID packet to search the corresponding IP tunnel, perform IP tunnel encapsulation for the EID packet, and then transmit the message to the BRAS;

the BRAS is further configured to analyze the received IP-tunnel-encapsulated packet to obtain the EID packet; and is further configured to use the destination EID of the EID packet to search the PPPoE session of the corresponding user, perform PPPoE frame encapsulation for the EID packet, and transmit the PPPoE-encapsulated frame; and the terminal further comprises: a receiving module, configured to obtain the EID-encapsulated packet after receiving the PPPoE-encapsulated frame; and a decapsulation module, configured to decapsulate specific service data from the EID-encapsulated packet, and delivery the specific service data to specific application.

* * * * *